United States Patent
Zohar et al.

(10) Patent No.: US 8,112,553 B2
(45) Date of Patent: Feb. 7, 2012

(54) DATA ALLOCATION IN A DISTRIBUTED STORAGE SYSTEM

(75) Inventors: Ofir Zohar, Alfe-Menashe (IL); Yaron Revah, Tel-Aviv (IL); Haim Helman, Ramat Gan (IL); Dror Cohen, Petach-Tikva (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/020,043

(22) Filed: Feb. 3, 2011

(65) Prior Publication Data

US 2011/0138150 A1     Jun. 9, 2011

Related U.S. Application Data (63) Continuation of application No. 10/620,080, filed on Jul. 15, 2003, now Pat. No. 7,908,413.

(51) Int. Cl.
*G06F 3/00* (2006.01)

(52) U.S. Cl. .......... 710/8; 710/3; 710/62; 711/147; 711/173; 711/202

(58) Field of Classification Search ............... 710/3, 8, 710/62; 711/147, 173, 202
See application file for complete search history.

(56) References Cited

U.S. PATENT DOCUMENTS

| | | | |
|---|---|---|---|
| 5,390,327 A | 2/1995 | Lubbers et al. | |
| 5,392,244 A | 2/1995 | Jacobson et al. | |
| 5,519,844 A | 5/1996 | Stallmo | |
| 5,615,352 A | 3/1997 | Jacobson et al. | |
| 5,875,481 A | 2/1999 | Ashton et al. | |
| 6,061,732 A | 5/2000 | Korst et al. | |
| 6,317,815 B1 | 11/2001 | Mayer et al. | |
| 6,332,177 B1 | 12/2001 | Humlicek | |
| 6,425,059 B1 * | 7/2002 | Basham et al. | 711/153 |
| 6,434,666 B1 | 8/2002 | Takahashi et al. | |
| 6,453,404 B1 | 9/2002 | Bereznyi et al. | |
| 7,003,628 B1 * | 2/2006 | Wiedenman et al. | 711/118 |
| 7,096,328 B2 | 8/2006 | Yao et al. | |
| 2002/0156892 A1 | 10/2002 | Karger et al. | |
| 2002/0162047 A1 | 10/2002 | Peters et al. | |
| 2004/0003173 A1 | 1/2004 | Yao et al. | |

OTHER PUBLICATIONS

Karger et al., "Consistent Hashing and Random Trees: Distributed Cashing Protocols for Relieving Hot Spots on the World Wide Web," Proceedings of the 29th ACM Symposium on Theory of Computing, May 1997, pp. 654-663.

(Continued)

*Primary Examiner* — Tariq Hafiz
*Assistant Examiner* — Jasjit Vidwan
(74) *Attorney, Agent, or Firm* — Griffiths & Seaton (57) ABSTRACT

A method for data distribution, including distributing logical addresses among an initial set of devices so as provide balanced access, and transferring the data to the devices in accordance with the logical addresses. If a device is added to the initial set, forming an extended set, the logical addresses are redistributed among the extended set so as to cause some logical addresses to be transferred from the devices in the initial set to the additional device. There is substantially no transfer of the logical addresses among the initial set. If a surplus device is removed from the initial set, forming a depleted set, the logical addresses of the surplus device are redistributed among the depleted set. There is substantially no transfer of the logical addresses among the depleted set. In both cases the balanced access is maintained.

20 Claims, 8 Drawing Sheets

OTHER PUBLICATIONS

Tang et al., "Differentiated Object Placement and Location for Self-Organizing Storage Clusters," Technical Report 2002-32 of University of California, Santa Barbara, Nov. 2002, 14 pages.

Brinkmann et al., "Compact, Adaptive Placement Schemes for Non-Uniform Capacities," Proceedings of the 14th ACM Symposium on Parallel Algorithms and Architectures (SPAA), Aug. 2002, 10 pages.

Cortes et al. "Extending Heterogeneity to RAID level 5,"Proceedings of the 2001 Usenix Annual Technical Conference, XP002367549, 2001, pp. 119-132, XP002367549.

Yager, "The Great Little File System Veritas Provides Flexible, Secure Data Storage for Unix SVR4.2 Systems," Byte, McGraw Hill Inc., vol. 20, No. 2, Feb. 1995, pp. 155-156, 158.

* cited by examiner

DATA ALLOCATION IN A DISTRIBUTED STORAGE SYSTEM

CROSS-REFERENCE TO RELATED APPLICATION

This application is a continuation of U.S. patent application Ser. No. 10/620,080, filed Jul. 15, 2003, which is incorporated herein by reference.

FIELD OF THE INVENTION

The present invention relates generally to data storage, and specifically to data storage in distributed data storage entities.

BACKGROUND OF THE INVENTION

A distributed data storage system typically comprises cache memories that are coupled to a number of disks wherein the data is permanently stored. The disks may be in the same general location, or be in completely different locations. Similarly, the caches may be localized or distributed. The storage system is normally used by one or more hosts external to the system.

Using more than one cache and more than one disk leads to a number of very practical advantages, such as protection against complete system failure if one of the caches or one of the disks malfunctions. Redundancy may be incorporated into a multiple cache or multiple disk system, so that failure of a cache or a disk in the distributed storage system is not apparent to one of the external hosts, and has little effect on the functioning of the system.

While distribution of the storage elements has undoubted advantages, the fact of the distribution typically leads to increased overhead compared to a local system having a single cache and a single disk. Inter alia, the increased overhead is required to manage the increased number of system components, to equalize or attempt to equalize usage of the components, to maintain redundancy among the components, to operate a backup system in the case of a failure of one of the components, and to manage addition of components to, or removal of components from, the system. A reduction in the required overhead for a distributed storage system is desirable.

An article titled "Consistent Hashing and Random Trees: Distributed Caching Protocols for Relieving Hot Spots on the World Wide Web," by Karger et al., in the Proceedings of the 29th ACM Symposium on Theory of Computing, pages 654-663, (May 1997), whose disclosure is incorporated herein by reference, describes caching protocols for relieving "hot spots" in distributed networks. The article describes a hashing technique of consistent hashing, and the use of a consistent hashing function. Such a function allocates objects to devices so as to spread the objects evenly over the devices, so that there is a minimal redistribution of objects if there is a change in the devices, and so that the allocation is consistent, i.e., is reproducible. The article applies a consistent hashing function to read-only cache systems, i.e., systems where a client may only read data from the cache system, not write data to the system, in order to distribute input/output requests to the systems. A read-only cache system is used in much of the World Wide Web, where a typical user is only able to read from sites on the Web having such a system, not write to such sites.

An article titled "Differentiated Object Placement and Location for Self-Organizing Storage Clusters," by Tang et al., in Technical Report 2002-32 of the University of California, Santa Barbara (November, 2002), whose disclosure is incorporated herein by reference, describes a protocol for managing a storage system where components are added or removed from the system. The protocol uses a consistent hashing scheme for placement of small objects in the system. Large objects are placed in the system according to a usage-based policy.

An article titled "Compact, Adaptive Placement Schemes for Non-Uniform Capacities," by Brinkmann et al., in the August, 2002, Proceedings of the 14th ACM Symposium on Parallel Algorithms and Architectures (SPAA), whose disclosure is incorporated herein by reference, describes two strategies for distributing objects among a heterogeneous set of servers. Both strategies are based on hashing systems.

U.S. Pat. No. 5,875,481 to Ashton, et al., whose disclosure is incorporated herein by reference, describes a method for dynamic reconfiguration of data storage devices. The method assigns a selected number of the data storage devices as input devices and a selected number of the data storage devices as output devices in a predetermined input/output ratio, so as to improve data transfer efficiency of the storage devices.

U.S. Pat. No. 6,317,815 to Mayer, et al., whose disclosure is incorporated herein by reference, describes a method and apparatus for reformatting a main storage device of a computer system. The main storage device is reformatted by making use of a secondary storage device on which is stored a copy of the data stored on the main device.

U.S. Pat. No. 6,434,666 to Takahashi, et al., whose disclosure is incorporated herein by reference, describes a memory control apparatus. The apparatus is interposed between a central processing unit (CPU) and a memory device that stores data. The apparatus has a plurality of cache memories to temporarily store data which is transferred between the CPU and the memory device, and a cache memory control unit which selects the cache memory used to store the data being transferred.

U.S. Pat. No. 6,453,404 to Bereznyi, et al., whose disclosure is incorporated herein by reference, describes a cache system that allocates memory for storage of data items by defining a series of small blocks that are uniform in size. The cache system, rather than an operating system, assigns one or more blocks for storage of a data item.

SUMMARY OF THE INVENTION

It is an object of some aspects of the present invention to provide a system for distributed data allocation.

In preferred embodiments of the present invention, a data distribution system comprises a plurality of data storage devices wherein data blocks may be stored. The data blocks are stored at logical addresses that are assigned to the data storage devices according to a procedure which allocates the addresses among the devices in a manner that reduces the overhead incurred when a device is added to or removed from the system, and so as to provide a balanced access to the devices. The procedure typically distributes the addresses evenly among the devices, regardless of the number of devices in the system. If a storage device is added to or removed from the system, the procedure reallocates the logical addresses between the new numbers of devices so that the balanced access is maintained. If a device has been added, the procedure only transfers addresses to the added storage device. If a device has been removed, the procedure only transfers addresses from the removed storage device. In both cases, the only transfers of data that occur are of data blocks stored at the transferred addresses. The procedure thus minimizes data transfer and associated management overhead when the number of storage devices is changed, or when the device configuration is changed, while maintaining the balanced access.

In some preferred embodiments of the present invention, the procedure comprises a consistent hashing function. The function is used to allocate logical addresses for data block storage to the storage devices at initialization of the storage system. The same function is used to consistently reallocate the logical addresses and data blocks stored therein when the number of devices in the system changes. Alternatively, the procedure comprises allocating the logical addresses between the devices according to a randomizing process at initialization. The randomizing process generates a table giving a correspondence between specific logical addresses and the devices. The same randomizing process is used to reallocate the logical addresses and their stored data blocks on a change of storage devices In some preferred embodiments of the present invention, the procedure comprises allocating two copies of a logical address to two separate storage devices, the two devices being used to store copies of a data block, so that the data block is protected against device failure. The procedure spreads the data block copies uniformly across all the storage devices. On failure of any one of the devices, copies of data blocks of the failed device are still spread uniformly across the remaining devices, and are immediately available to the system. Consequently, device failure has a minimal effect on the performance of the distribution system.

There is therefore provided, according to a preferred embodiment of the present invention, a method for data distribution, including:

distributing logical addresses among an initial set of storage devices so as provide a balanced access to the devices;

transferring the data to the storage devices in accordance with the logical addresses;

adding an additional storage device to the initial set, thus forming an extended set of the storage devices consisting of the initial set and the additional storage device; and redistributing the logical addresses among the storage devices in the extended set so as to cause a portion of the logical addresses to be transferred from the storage devices in the initial set to the additional storage device, while maintaining the balanced access and without requiring a substantial transfer of the logical addresses among the storage devices in the initial set.

Preferably, redistributing the logical addresses consists of no transfer of the logical addresses between the storage devices in the initial set.

Preferably, distributing the logical addresses includes applying a consistent hashing function to the initial set of storage devices so as to determine respective initial locations of the logical addresses among the initial set, and redistributing the logical addresses consists of applying the consistent hashing function to the extended set of storage devices so as to determine respective subsequent locations of the logical addresses among the extended set.

Alternatively, distributing the logical addresses includes applying a randomizing function to the initial set of storage devices so as to determine respective initial locations of the logical addresses among the initial set, and redistributing the logical addresses consists of applying the randomizing function to the extended set of storage devices so as to determine respective subsequent locations of the logical addresses among the extended set.

At least one of the storage devices preferably includes a fast access time memory; alternatively or additionally, at least one of the storage devices preferably includes a slow access time mass storage device.

Preferably, the storage devices have substantially equal capacities, and distributing the logical addresses includes distributing the logical addresses substantially evenly among the initial set, and redistributing the logical addresses consists of redistributing the logical addresses substantially evenly among the extended set.

Alternatively, a first storage device of the storage devices has a first capacity different from a second capacity of a second storage device of the storage devices, and distributing the logical addresses includes distributing the logical addresses substantially according to a ratio of the first capacity to the second capacity, and redistributing the logical addresses includes redistributing the logical addresses substantially according to the ratio.

Preferably, distributing the logical addresses includes allocating a specific logical address to a first storage device and to a second storage device, the first and second storage devices being different storage devices, and storing the data consists of storing a first copy of the data on the first storage device and a second copy of the data on the second storage device.

The method preferably includes writing the data from a host external to the storage devices, and reading the data to the external host from the storage devices.

There is further provided, according to a preferred embodiment of the present invention, an alternative method for distributing data, including:

distributing logical addresses among an initial set of storage devices so as provide a balanced access to the devices;

transferring the data to the storage devices in accordance with the logical addresses;

removing a surplus device from the initial set, thus forming a depleted set of the storage devices comprising the initial storage devices less the surplus storage device; and redistributing the logical addresses among the storage devices in the depleted set so as to cause logical addresses of the surplus device to be transferred to the depleted set, while maintaining the balanced access and without requiring a substantial transfer of logical addresses among the storage devices in the depleted set.

Preferably, redistributing the logical addresses consists of no transfer of the logical addresses to the storage devices in the depleted set apart from the logical addresses of the surplus device.

Distributing the logical addresses preferably consists of applying a consistent hashing function to the initial set of storage devices so as to determine respective initial locations of the logical addresses among the initial set, and redistributing the logical addresses preferably includes applying the consistent hashing function to the depleted set of storage devices so as to determine respective subsequent locations of the logical addresses among the depleted set.

Alternatively, distributing the logical addresses consists of applying a randomizing function to the initial set of storage devices so as to determine respective initial locations of the logical addresses among the initial set, and redistributing the logical addresses includes applying the randomizing function to the depleted set of storage devices so as to determine respective subsequent locations of the logical addresses among the depleted set.

The storage devices preferably have substantially equal capacities, and distributing the logical addresses consists of distributing the logical addresses substantially evenly among the initial set, and redistributing the logical addresses includes redistributing the logical addresses substantially evenly among the depleted set.

There is further provided, according to a preferred embodiment of the present invention, a method for distributing data among a set of storage devices, including:

applying a consistent hashing function to the set so as to allocate logical addresses to respective primary storage devices of the set and so as to provide a balanced access to the devices;

forming subsets of the storage devices by subtracting the respective primary storage devices from the set;

applying the consistent hashing function to the subsets so as to allocate the logical addresses to respective secondary storage devices of the subsets while maintaining the balanced access to the devices; and storing the data on the respective primary storage devices and a copy of the data on the respective secondary storage devices in accordance with the logical addresses.

There is further provided, according to a preferred embodiment of the present invention, a method for distributing data among a set of storage devices, including:

applying a randomizing function to the set so as to allocate logical addresses to respective primary storage devices of the set and so as to provide a balanced access to the devices;

forming subsets of the storage devices by subtracting the respective primary storage devices from the set;

applying the randomizing function to the subsets so as to allocate the logical addresses to respective secondary storage devices of the subsets while maintaining the balanced access to the devices; and storing the data on the respective primary storage devices and a copy of the data on the respective secondary storage devices in accordance with the logical addresses.

There is further provided, according to a preferred embodiment of the present invention, a data distribution system, including:

an initial set of storage devices among which are distributed logical addresses so as provide a balanced access to the devices, and wherein data is stored in accordance with the logical addresses; and an additional storage device to the initial set, thus forming an extended set of the storage devices comprising the initial set and the additional storage device, the logical addresses being redistributed among the storage devices in the extended set so as to cause a portion of the logical addresses to be transferred from the storage devices in the initial set to the additional storage device, while maintaining the balanced access and without requiring a substantial transfer of the logical addresses among the storage devices in the initial set.

There is further provided, according to a preferred embodiment of the present invention, a data distribution system, including:

an initial set of storage devices among which are distributed logical addresses so as provide a balanced access to the devices, and wherein data is stored in accordance with the logical addresses; and a depleted set of storage devices, formed by subtracting a surplus storage device from the initial set, the logical addresses being redistributed among the storage devices in the depleted set so as to cause logical addresses of the surplus device to be transferred to the depleted set, while maintaining the balanced access and without requiring a substantial transfer of the logical addresses among the storage devices in the depleted set.

Preferably, redistributing the logical addresses comprises no transfer of the logical addresses to the storage devices in the depleted set apart from the logical addresses of the surplus device.

The distributed logical addresses are preferably determined by applying a consistent hashing function to the initial set of storage devices so as to determine respective initial locations of the logical addresses among the initial set, and redistributing the logical addresses preferably includes applying the consistent hashing function to the depleted set of storage devices so as to determine respective subsequent locations of the logical addresses among the depleted set.

Alternatively, the distributed logical addresses are determined by applying a randomizing function to the initial set of storage devices so as to determine respective initial locations of the logical addresses among the initial set, and redistributing the logical addresses preferably includes applying the randomizing function to the depleted set of storage devices so as to determine respective subsequent locations of the logical addresses among the depleted set.

The storage devices preferably have substantially equal capacities, and the distributed logical addresses are distributed substantially evenly among the initial set, and redistributing the logical addresses includes redistributing the logical addresses substantially evenly among the depleted set.

Alternatively or additionally, a first storage device included in the storage devices has a first capacity different from a second capacity of a second storage device included in the storage devices, and the distributed logical addresses are distributed substantially according to a ratio of the first capacity to the second capacity, and redistributing the logical addresses includes redistributing the logical addresses substantially according to the ratio.

Preferably, the distributed logical addresses include a specific logical address allocated to a first storage device and a second storage device, the first and second storage devices being different storage devices, and storing the data includes storing a first copy of the data on the first storage device and a second copy of the data on the second storage device.

The system preferably includes a memory having a table wherein is stored a correspondence between a plurality of logical addresses and a specific storage device in the initial set, wherein the plurality of logical addresses are related to each other by a mathematical relation.

There is further provided, according to a preferred embodiment of the present invention, a data distribution system, including:

a set of data storage devices to which is applied a consistent hashing function so as to allocate logical addresses to respective primary storage devices of the set and so as to provide a balanced access to the devices; and subsets of the storage devices formed by subtracting the respective primary storage devices from the set, the consistent hashing function being applied to the subsets so as to allocate the logical addresses to respective secondary storage devices of the subsets while maintaining the balanced access to the devices, data being stored on the respective primary storage devices and a copy of the data being stored on the respective secondary storage devices in accordance with the logical addresses.

There is further provided, according to a preferred embodiment of the present invention, a data distribution system, including:

a set of data storage devices to which is applied a randomizing function so as to allocate logical addresses to respective primary storage devices of the set and so as to provide a balanced access to the devices; and subsets of the storage devices formed by subtracting the respective primary storage devices from the set, the randomizing function being applied to the subsets so as to allocate the logical addresses to respective secondary storage devices of the subsets while maintaining the balanced access to the devices, data being stored on the respective primary storage devices and a copy of the data being stored on the respective secondary storage devices in accordance with the logical addresses.

The present invention will be more fully understood from the following detailed description of the preferred embodiments thereof, taken together with the drawings, a brief description of which is given below.

DETAILED DESCRIPTION OF PREFERRED EMBODIMENTS

Figure 1:
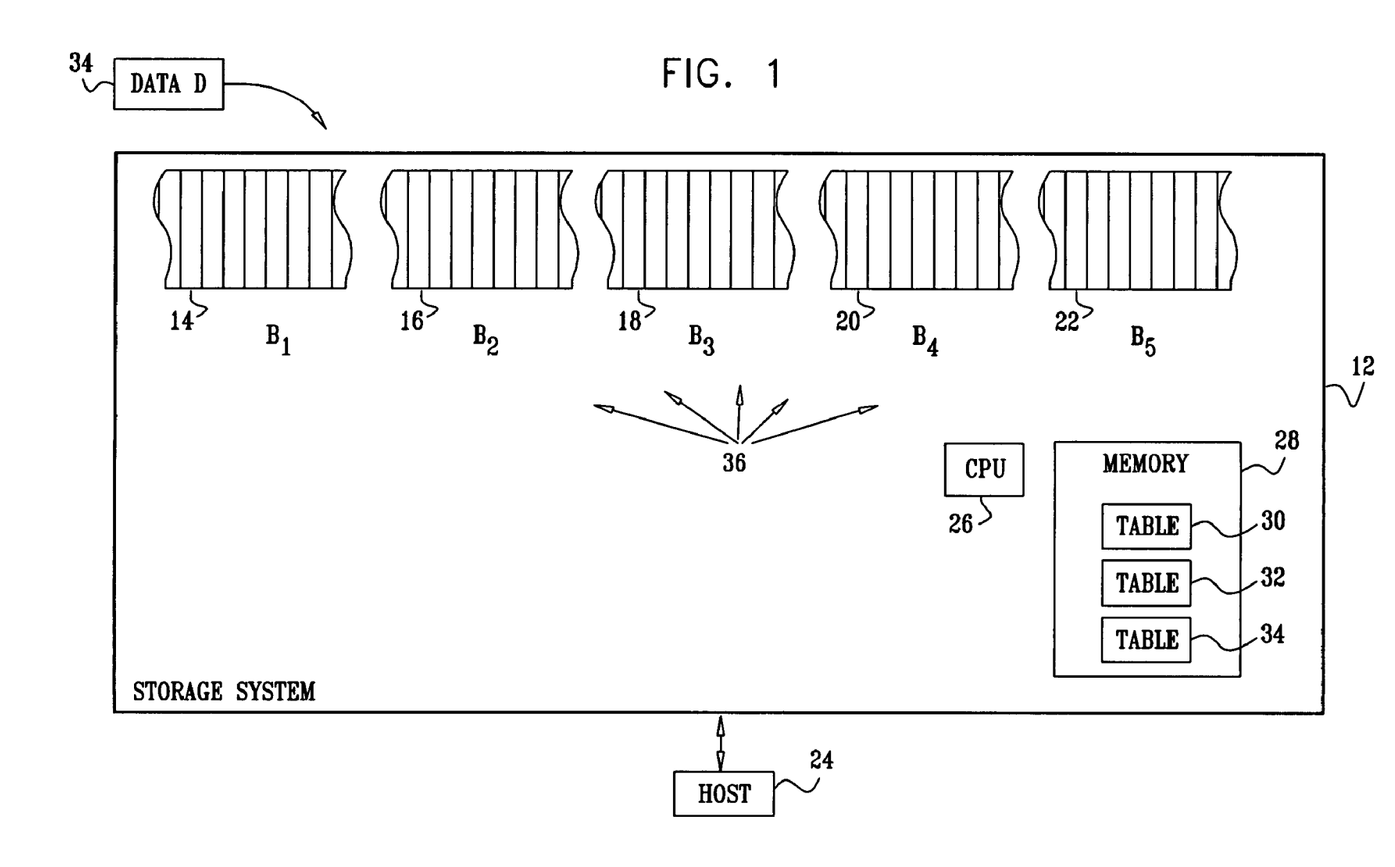
FIG. 1 illustrates distribution of data addresses among data storage devices, according to a preferred embodiment of the present invention.

Reference is now made to FIG. 1, which illustrates distribution of data addresses among data storage devices, according to a preferred embodiment of the present invention. A storage system 12 comprises a plurality of separate storage devices 14, 16, 18, 20, and 22, also respectively referred to herein as storage devices B1, B2, B3, B4, and B5, and collectively as devices Bn. It will be understood that system 12 may comprise substantially any number of physically separate devices, and that the five devices Bn used herein are by way of example. Devices Bn comprise any components wherein data 34, also herein termed data D, may be stored, processed, and/or serviced. Examples of devices Bn comprise random access memory (RAM) which has a fast access time and which are typically used as caches, disks which typically have a slow access time, or any combination of such components. A host 24 communicates with system 12 in order to read data from, or write data to, the system. A central processing unit (CPU) 26, using a memory 28, manages system 12, and allocates data D to devices Bn. The allocation of data D by CPU 26 to devices Bn is described in more detail below.

Data D is processed in devices Bn at logical block addresses (LBAs) of the devices by being written to the devices from host 24 and/or read from the devices by host 24. At initialization of system 12 CPU 26 distributes the LBAs of devices Bn among the devices using one of the pre-defined procedures described below. CPU 26 may then store data D at the LBAs.

In the description of the procedures hereinbelow, devices Bn are assumed to have substantially equal capacities, where the capacity of a specific device is a function of the device type. For example, for devices that comprise mass data storage devices having slow access times, such as disks, the capacity is typically defined in terms of quantity of data the device may store. For devices that comprise fast access time memories, such as are used in caches, the capacity is typically defined in terms of throughput of the device. Those skilled in the art will be able to adapt the procedures when devices Bn have different capacities, in which case ratios of the capacities are typically used to determine the allocations. The procedures allocate the logical stripes to devices Bn so that balanced access to the devices is maintained, where balanced access assumes that taken over approximately $10,000 \times N$ transactions with devices Bn, the fraction of capacities of devices Bn used are equal to within approximately 1%, where N is the number of devices Bn, the values being based on a Bernoulli distribution.

Figure 2:
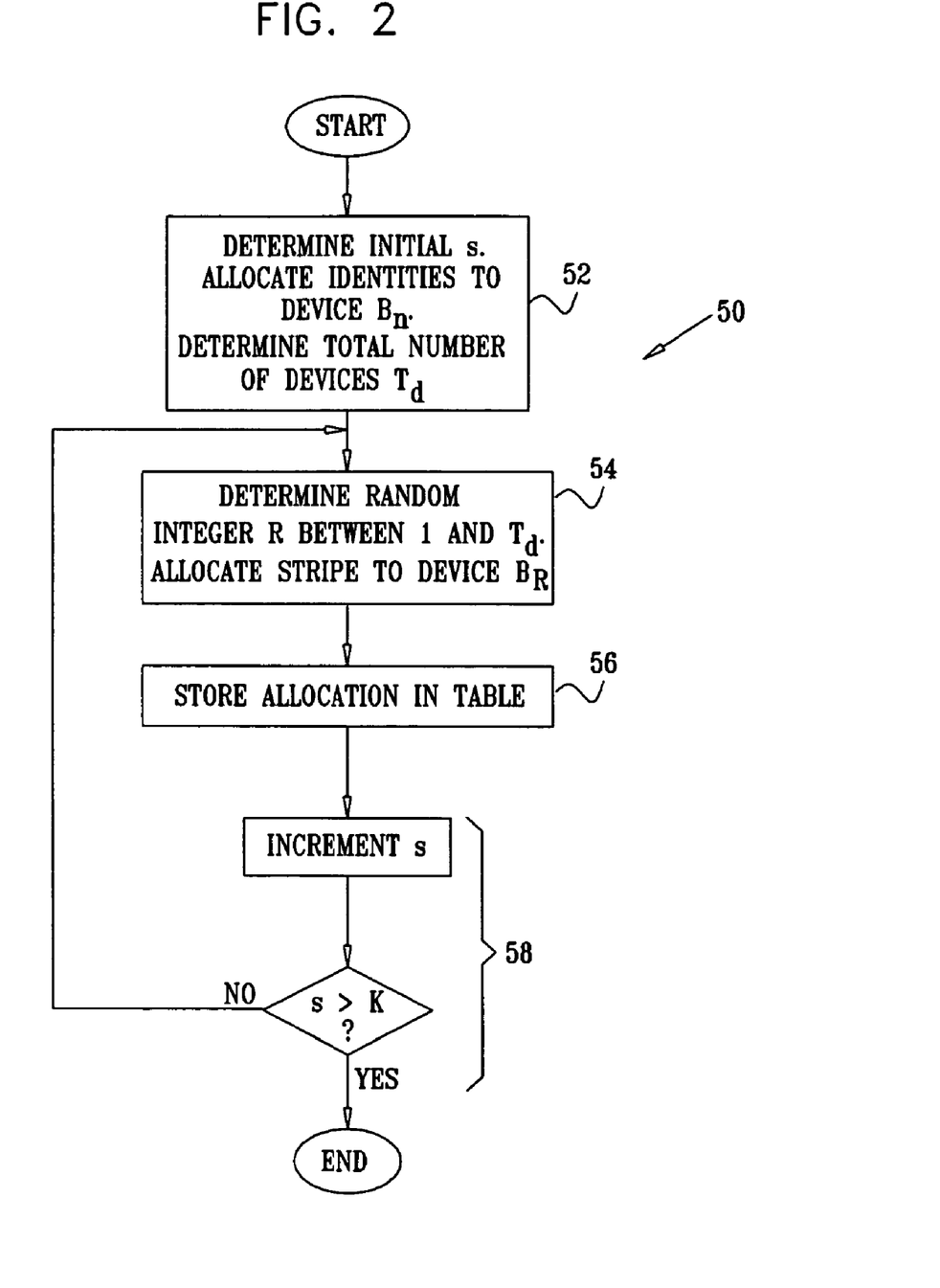
FIG. 2 is a flowchart describing a procedure for allocating addresses to the devices of FIG. 1, according to a preferred embodiment of the present invention.

FIG. 2 is a flowchart describing a procedure 50 for allocating LBAs to devices Bn, according to a preferred embodiment of the present invention. The LBAs are assumed to be grouped into k logical stripes/tracks, hereinbelow termed stripes 36 (FIG. 1), which are numbered 1, . . . , k, where k is a whole number. Each logical stripe comprises one or more consecutive LBAs, and all the stripes have the same length. Procedure 50 uses a randomizing function to allocate a stripe s to devices Bn in system 12. The allocations determined by procedure 50 are stored in a table 32 of memory 28.

In an initial step 52, CPU 26 determines an initial value of s, the total number Td of active devices Bn in system 12, and assigns each device Bn a unique integral identity between 1 and Td. In a second step 54, the CPU generates a random integer R between 1 and Td, and allocates stripe s to the device Bn corresponding to R. In a third step 56, the allocation determined in step 54 is stored in table 32. Procedure 50 continues, in a step 58, by incrementing the value of s, until all stripes of devices Bn have been allocated, i.e., until s>k, at which point procedure 50 terminates.

Table I below is an example of an allocation table generated by procedure 50, for system 12, wherein Td=5. The identifying integers for each device Bn, as determined by CPU 26 in step 52, are assumed to be 1 for B1, 2 for B2, . . . , 5 for B5.

TABLE I

| Stripe s | Random Number R | Device $B_S$ |
| --- | --- | --- |
| 1 | 3 | $B_3$ |
| 2 | 5 | $B_5$ |
| . . . | . . . | . . . |
| 6058 | 2 | $B_2$ |
| 6059 | 2 | $B_2$ |
| 6060 | 4 | $B_4$ |
| 6061 | 5 | $B_5$ |
| 6062 | 3 | $B_3$ |
| 6063 | 5 | $B_5$ |
| 6064 | 1 | $B_1$ |
| 6065 | 3 | $B_3$ |
| 6066 | 2 | $B_2$ |
| 6067 | 3 | $B_3$ |

TABLE I-continued

| Stripe s | Random Number R | Device $B_S$ |
|---|---|---|
| 6068 | 1 | $B_1$ |
| 6069 | 2 | $B_2$ |
| 6070 | 4 | $B_4$ |
| 6071 | 5 | $B_5$ |
| 6072 | 4 | $B_4$ |
| 6073 | 1 | $B_1$ |
| 6074 | 5 | $B_5$ |
| 6075 | 3 | $B_3$ |
| 6076 | 1 | $B_1$ |
| 6077 | 2 | $B_2$ |
| 6078 | 4 | $B_4$ |
| ... | ... | ... |

Figure 3:
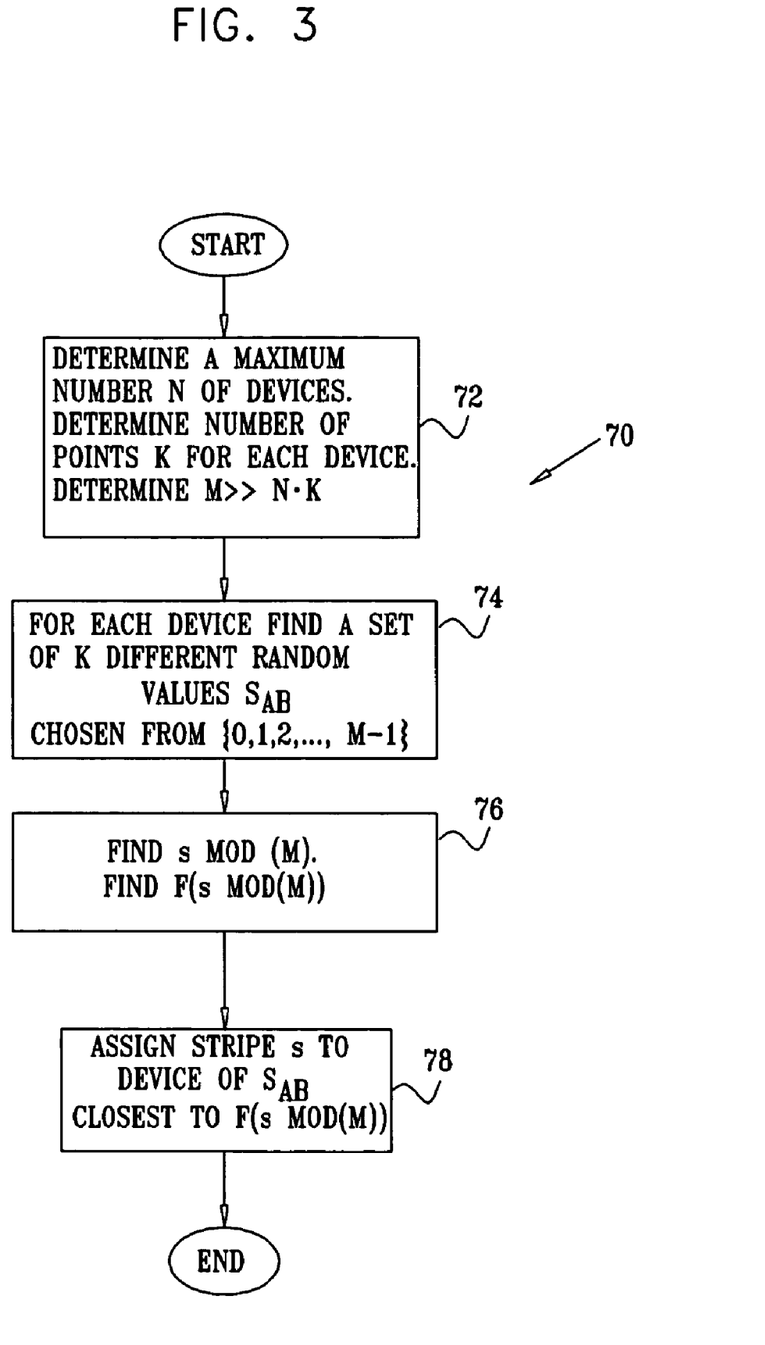
FIG. 3 is a flowchart describing an alternative procedure for allocating addresses to the devices of FIG. 1, according to a preferred embodiment of the present invention.

FIG. 3 is a flowchart showing steps of a procedure 70 using a consistent hashing function to allocate stripes to devices Bn, according to an alternative preferred embodiment of the present invention. In an initial step 72, CPU 26 determines a maximum number N of devices Bn for system 12, and a number of points k for each device. The CPU then determines an integer M, such that M>>N·k.

In a second step 74, CPU 26 determines N sets Jn of k random values Sab, each set corresponding to a possible device Bn, as given by equations (1):

$$J_1 = \{S_{11}, S_{12}, \ldots, S_{1k}\} \text{ for device } B_1;$$ (1)

$$J_2 = \{S_{21}, S_{22}, \ldots, S_{2k}\} \text{ for device } B_2;$$

$$\ldots$$

$$J_N = \{S_{N1}, S_{N2}, \ldots, S_{Nk}\} \text{ for device } B_N.$$

Each random value Sab is chosen from $\{0, 1, 2, \ldots, M-1\}$, and the value of each Sab may not repeat, i.e., each value may only appear once in all the sets. The sets of random values are stored in memory 28.

In a third step 76, for each stripe s CPU 26 determines a value of $s \mod(M)$ and then a value of $F(s \mod(M))$, where F is a permutation function that reassigns the value of $s \mod(M)$ so that in a final step 78 consecutive stripes will generally be mapped to different devices Bn.

In final step 78, the CPU finds, typically using an iterative search process, the random value chosen in step 74 that is closest to $F(s \mod(M))$. CPU 26 then assigns the device Bn of the random value to stripe s, according to equations (1).

It will be appreciated that procedure 70 illustrates one type of consistent hashing function, and that other such functions may be used by system 12 to allocate LBAs to devices operating in the system. All such consistent hashing functions are assumed to be comprised within the scope of the present invention.

Procedure 70 may be incorporated into memory 28 of system 12 (FIG. 1), and the procedure operated by CPU 26 when allocation of stripes s are required, such as when data is to be read from or written to system 12. Alternatively, a table 30 of the results of applying procedure 70, generally similar to the first and last columns of Table I, may be stored in memory 28, and accessed by CPU 26 as required.

Figure 4:
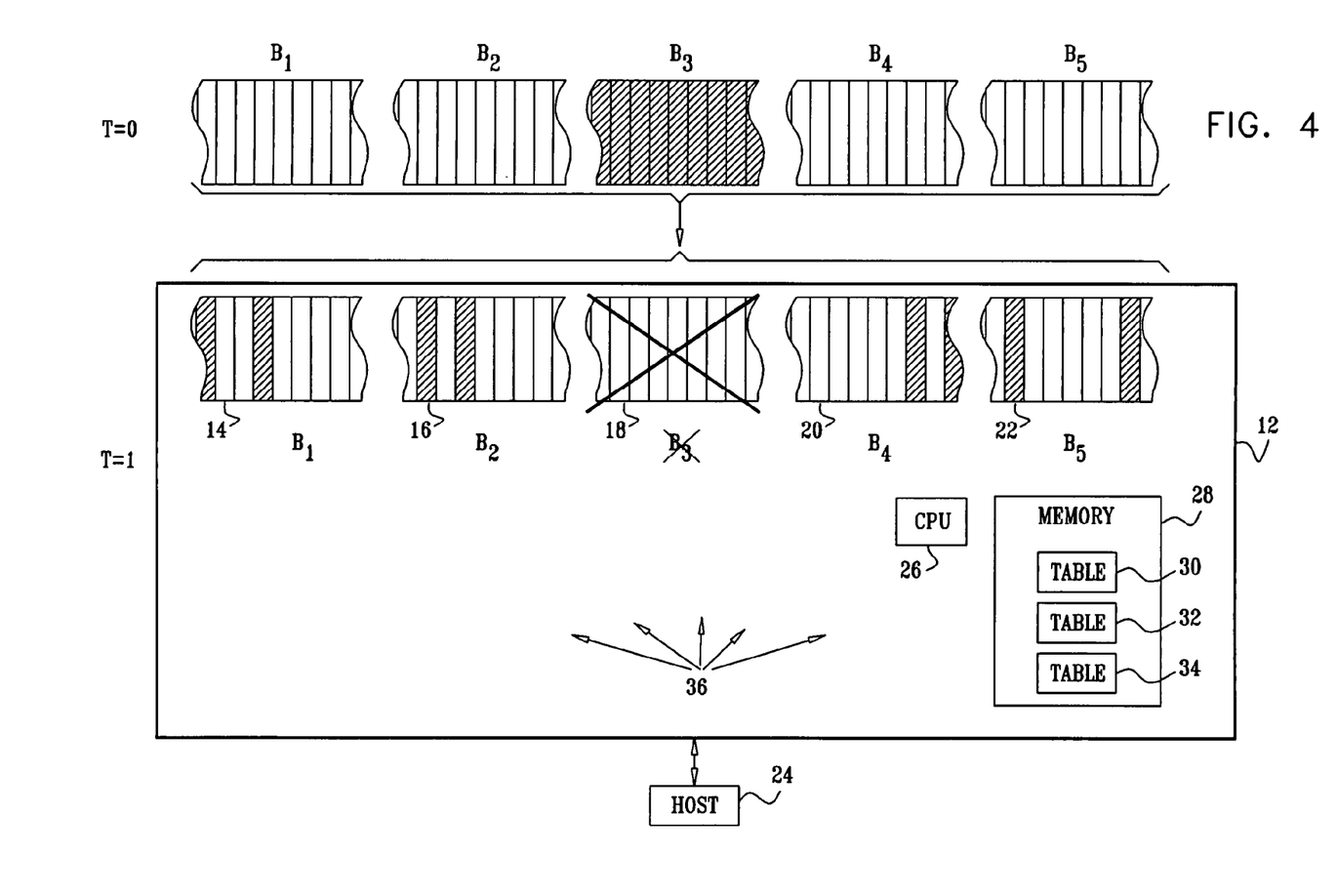
FIG. 4 is a schematic diagram illustrating reallocation of addresses when a storage device is removed from the devices of FIG. 1, according to a preferred embodiment of the present invention.

FIG. 4 is a schematic diagram illustrating reallocation of stripes when a storage device is removed from storage system 12, according to a preferred embodiment of the present invention. By way of example, device B3 is assumed to be no longer active in system 12 at a time t=1, after initialization time t=0, and the stripes initially allocated to the device, and any data stored therein, are reallocated to the depleted set of devices B1, B2, B4, B5 of the system. Device B3 may be no longer active for a number of reasons known in the art, such as device failure, or the device becoming surplus to the system, and such a device is herein termed a surplus device. The reallocation is performed using procedure 50 or procedure 70, preferably according to the procedure that was used at time t=0. As is illustrated in FIG. 4, and as is described below, stripes from device B3 are substantially evenly redistributed among devices B1, B2, B4, B5.

If procedure 50 (FIG. 2) is applied at t=1, the procedure is applied to the stripes of device B3, so as to randomly assign the stripes to the remaining active devices of system 12. In this case, at step 52 the total number of active devices Td=4, and identifying integers for each active device Bn are assumed to be 1 for B1, 2 for B2, 4 for B4, 3 for B5. CPU 26 generates a new table, corresponding to the first and last columns of Table II below for the stripes that were allocated to B3 at t=0, and the stripes are reassigned according to the new table. Table II illustrates reallocation of stripes for device B3 (from the allocation shown in Table I).

TABLE II

| Stripe s | Device $B_S$<br>t = 0 | Random Number R<br>t = 1 | Device $B_S$<br>t = 1 |
|---|---|---|---|
| 1 | $B_3$ | 1 | $B_1$ |
| 2 | $B_5$ |  | $B_5$ |
| ... | ... | ... | ... |
| 6058 | $B_2$ |  | $B_2$ |
| 6059 | $B_2$ |  | $B_2$ |
| 6060 | $B_4$ |  | $B_4$ |
| 6061 | $B_5$ |  | $B_5$ |
| 6062 | $B_3$ | 3 | $B_5$ |
| 6063 | $B_5$ |  | $B_5$ |
| 6064 | $B_1$ |  | $B_1$ |
| 6065 | $B_3$ | 2 | $B_2$ |
| 6066 | $B_2$ |  | $B_2$ |
| 6067 | $B_3$ | 3 | $B_5$ |
| 6068 | $B_1$ |  | $B_1$ |
| 6069 | $B_2$ |  | $B_2$ |
| 6070 | $B_4$ |  | $B_4$ |
| 6071 | $B_5$ |  | $B_5$ |
| 6072 | $B_4$ |  | $B_4$ |
| 6073 | $B_1$ |  | $B_1$ |
| 6074 | $B_5$ |  | $B_5$ |
| 6075 | $B_3$ | 4 | $B_4$ |
| 6076 | $B_1$ |  | $B_1$ |
| 6077 | $B_2$ |  | $B_2$ |
| 6078 | $B_4$ |  | $B_4$ |
| ... | ... | ... | ... |

It will be appreciated that procedure 50 only generates transfer of stripes from the device that is no longer active in system 12, and that the procedure reallocates the stripes, and any data stored therein, substantially evenly over the remaining active devices of the system. No reallocation of stripes occurs in system 12 other than stripes that were initially allocated to the device that is no longer active. Similarly, no transfer of data occurs other than data that was initially in the device that is no longer active. Also, any such transfer of data may be performed by CPU 26 transferring the data directly from the inactive device to the reallocated device, with no intermediate device needing to be used.

Similarly, by consideration of procedure 70 (FIG. 3), it will be appreciated that procedure 70 only generates transfer of stripes, and reallocation of data stored therein, from the device that is no longer active in system 12, i.e., device B3. Procedure 70 reallocates the stripes (and thus their data) from B3 substantially evenly over the remaining devices B1, B2, B4, B5 of the system, no reallocation of stripes or data occurs in system 12 other than stripes/data that were initially in B3, and such data transfer as may be necessary may be performed by direct transfer to the remaining active devices. It will also be understood that if B3 is returned to system 12 at some future time, the allocation of stripes after procedure 70 is implemented is the same as the initial allocation generated by the procedure.

Figure 5:
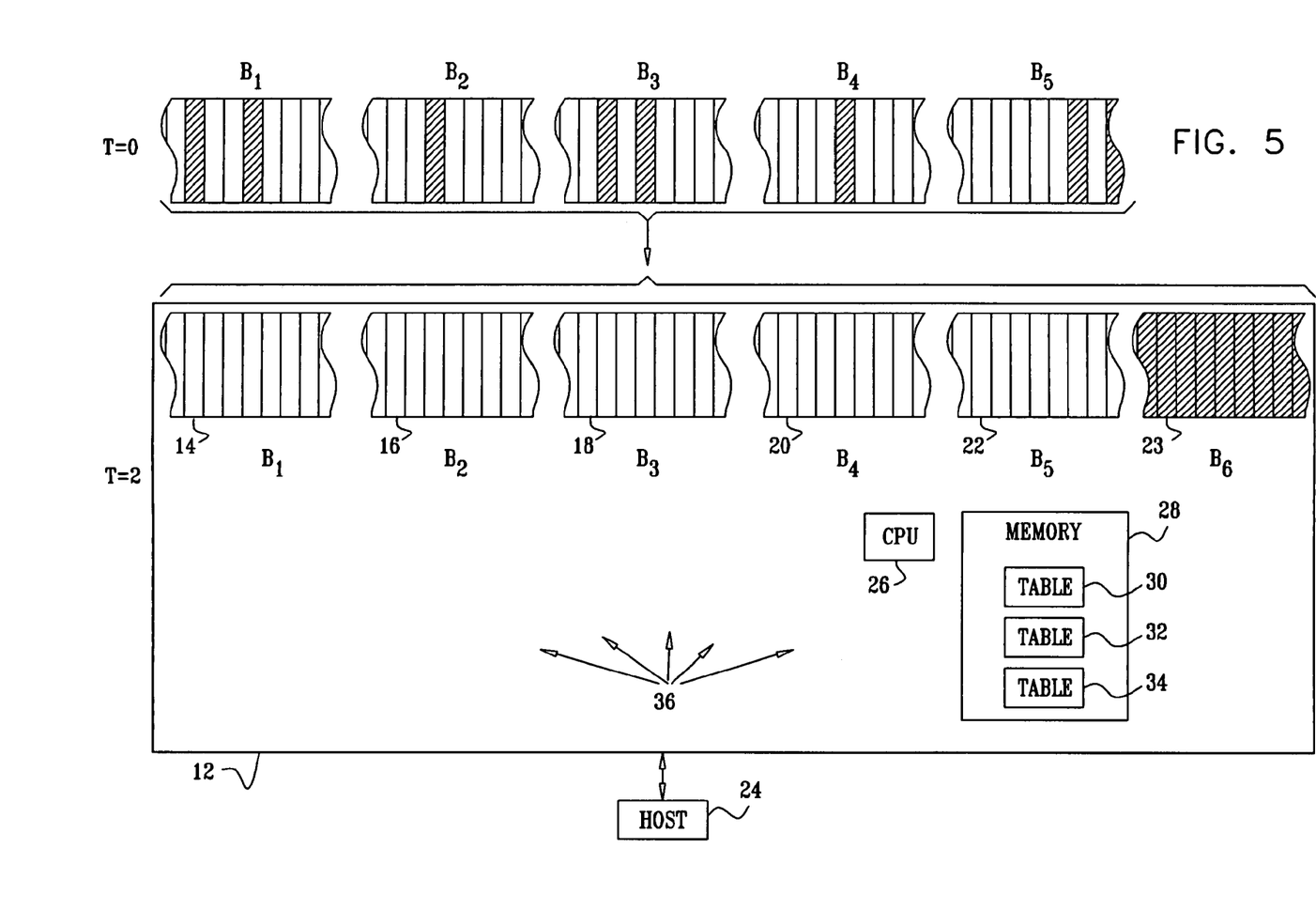
FIG. 5 is a schematic diagram illustrating reallocation of addresses when a storage device is added to the devices of FIG. 1, according to a preferred embodiment of the present invention.

FIG. 5 is a schematic diagram illustrating reallocation of stripes when a storage device is added to storage system 12, according to a preferred embodiment of the present invention. By way of example, a device 23, also herein termed device B6, is assumed to be active in system 12 at time t=2, after initialization time t=0, and some of the stripes initially allocated to an initial set of devices B1, B2, B3, B4, B5, and any data stored therein, are reallocated to device B6. The reallocation is performed using procedure 70 or a modification of procedure 50 (described in more detail below with reference to FIG. 6), preferably according to the procedure that was used at time t=0. As is illustrated in FIG. 5, and as is described below, stripes from devices B1, B2, B3, B4, B5 are substantially evenly removed from the devices and are transferred to device B6. B1, B2, B3, B4, B5, B6 act as an extended set of the initial set.

Figure 6:
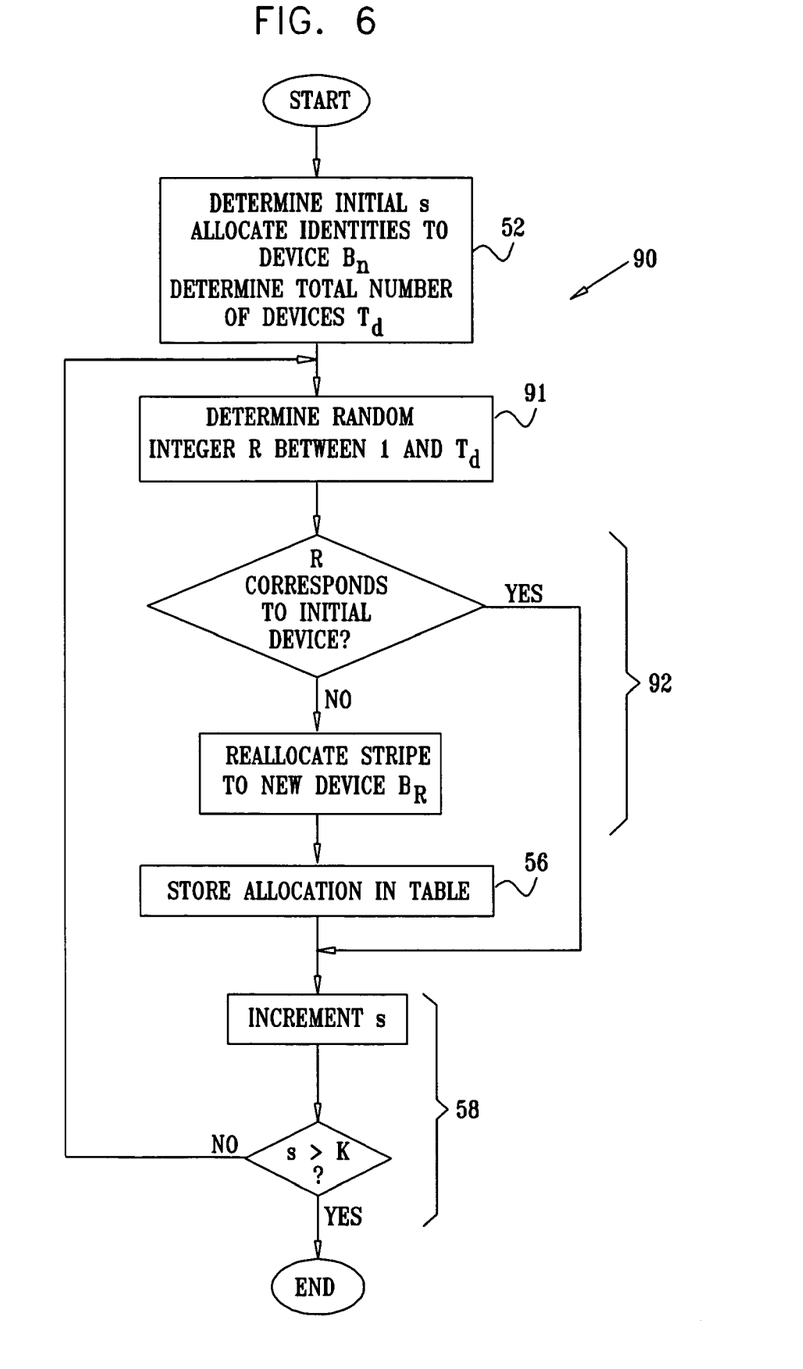
FIG. 6 is a flowchart describing a procedure that is a modification of the procedure of FIG. 2, according to a preferred embodiment of the present invention.

FIG. 6 is a flowchart describing a procedure 90 that is a modification of procedure 50 (FIG. 2), according to an alternative preferred embodiment of the present invention. Apart from the differences described below, procedure 90 is generally similar to procedure 50, so that steps indicated by the same reference numerals in both procedures are generally identical in implementation. As in procedure 50, procedure 90 uses a randomizing function to allocate stripes s to devices Bn in system 12, when a device is added to the system. The allocations determined by procedure 90 are stored in table 32 of memory 28.

Assuming procedure 50 is applied at t=2, at step 52 the total number of active devices Td=6, and identifying integers for each active device Bn are assumed to be 1 for B1, 2 for B2, 3 for B3, 4 for B4, 5 for B5, 6 for B6. In a step 91 CPU 26 determines a random integer between 1 and 6.

In a step 92, the CPU determines if the random number corresponds to one of the devices present at time t=0. If it does correspond, then CPU 26 returns to the beginning of procedure 90 by incrementing stripe s, via step 58, and no reallocation of stripe s is made. If it does not correspond, i.e., the random number is 6, corresponding to device B6, the stripe is reallocated to device B6. In step 56, the reallocated location is stored in table 32. Procedure 90 then continues to step 58. Table III below illustrates the results of applying procedure 90 to the allocation of stripes given in Table II.

TABLE III

| Stripe s | Device $B_S$ t = 0 | Random Number R t = 2 | Device $B_S$ t = 2 |
|---|---|---|---|
| 1 | $B_3$ | 6 | $B_6$ |
| 2 | $B_5$ | 4 | $B_5$ |
| ... | ... | ... | ... |
| 6058 | $B_2$ | 5 | $B_2$ |
| 6059 | $B_2$ | 3 | $B_2$ |
| 6060 | $B_4$ | 5 | $B_4$ |
| 6061 | $B_5$ | 6 | $B_6$ |
| 6062 | $B_3$ | 3 | $B_5$ |
| 6063 | $B_5$ | 1 | $B_5$ |
| 6064 | $B_1$ | 3 | $B_1$ |
| 6065 | $B_3$ | 1 | $B_2$ |
| 6066 | $B_2$ | 6 | $B_6$ |
| 6067 | $B_3$ | 4 | $B_5$ |
| 6068 | $B_1$ | 5 | $B_1$ |
| 6069 | $B_2$ | 2 | $B_2$ |
| 6070 | $B_4$ | 1 | $B_4$ |
| 6071 | $B_5$ | 5 | $B_5$ |
| 6072 | $B_4$ | 2 | $B_4$ |
| 6073 | $B_1$ | 4 | $B_1$ |
| 6074 | $B_5$ | 5 | $B_5$ |
| 6075 | $B_3$ | 1 | $B_4$ |
| 6076 | $B_1$ | 3 | $B_1$ |
| 6077 | $B_2$ | 6 | $B_6$ |
| 6078 | $B_4$ | 1 | $B_4$ |
| ... | ... | ... | ... |

It will be appreciated that procedure 90 only generates transfer of stripes, and thus reallocation of data, to device B6. The procedure reallocates the stripes to B6 by transferring stripes, substantially evenly, from devices B1, B2, B3, B4, B5 of the system, and no transfer of stripes, or data stored therein, occurs in system 12 other than stripes/data transferred to B6. Any such data transfer may be made directly to device B6, without use of an intermediate device Bn.

It will also be appreciated that procedure 70 may be applied when device B6 is added to system 12. Consideration of procedure 70 shows that similar results to those of procedure 90 apply, i.e., that there is only reallocation of stripes, and data stored therein, to device B6. As for procedure 90, procedure 70 generates substantially even reallocation of stripes/data from the other devices of the system.

Figure 7:
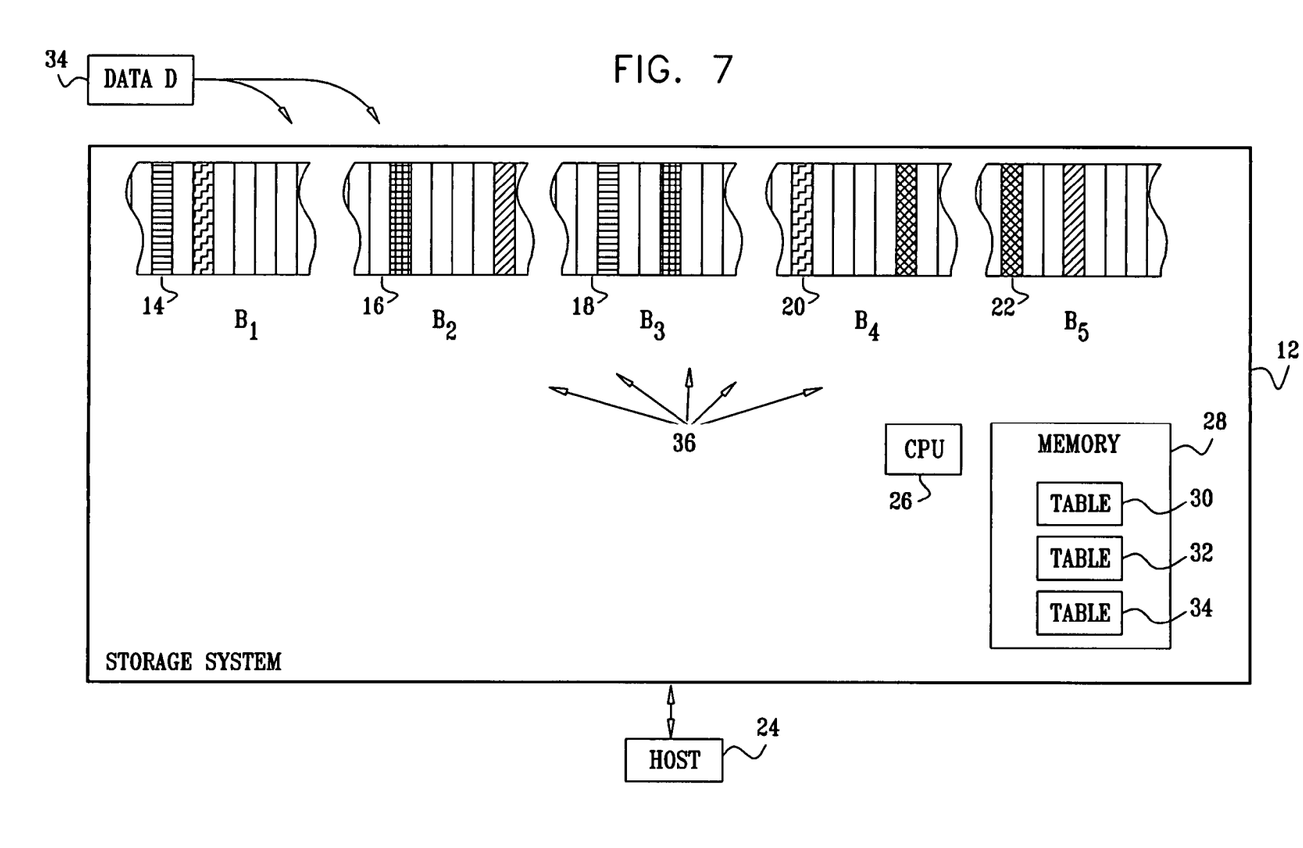
FIG. 7 is a schematic diagram which illustrates a fully mirrored distribution of data for the devices of FIG. 1, according to a preferred embodiment of the present invention.
Figure 8:
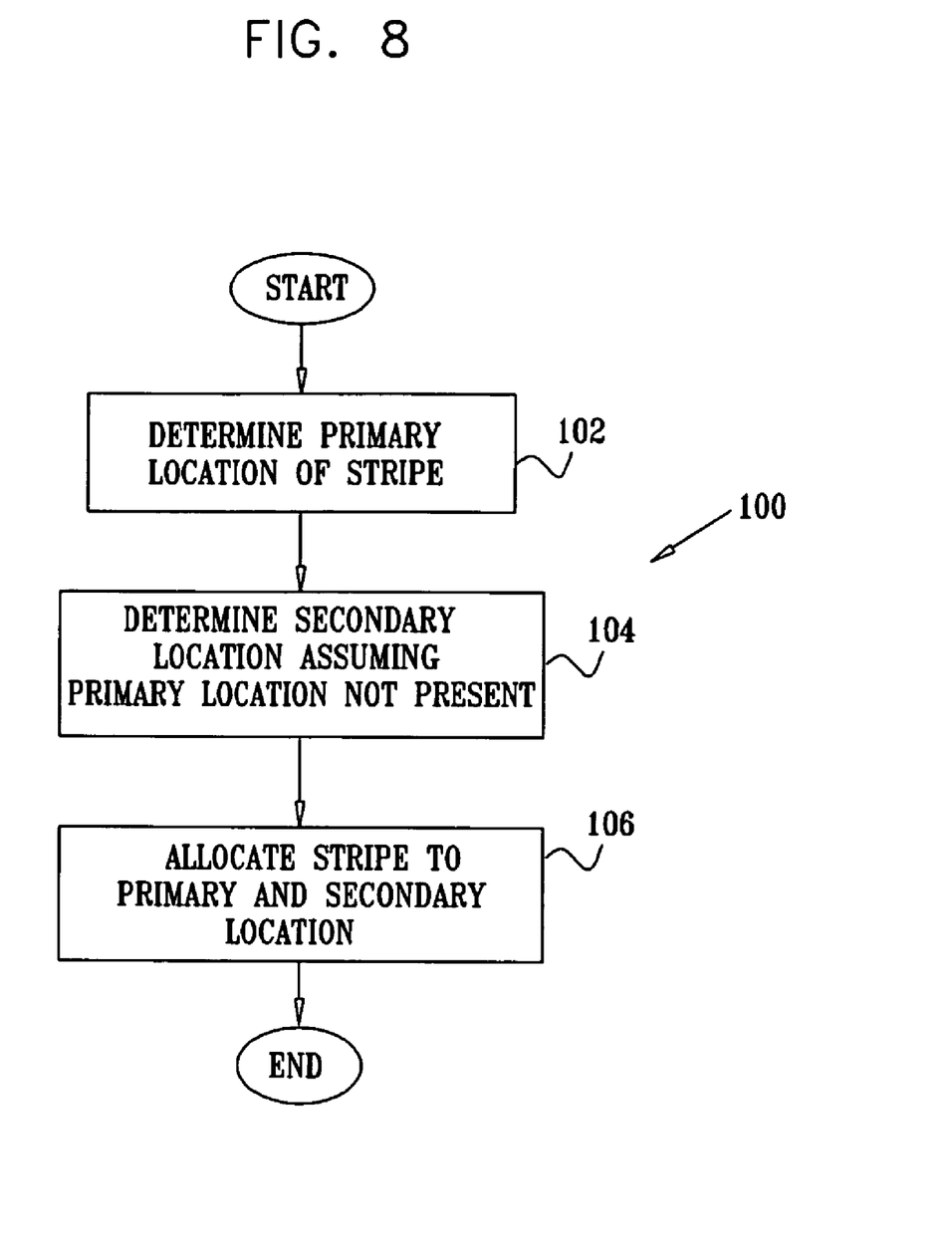
FIG. 8 is a flowchart describing a procedure for performing the distribution of FIG. 7, according to a preferred embodiments of the present invention.

FIG. 7 is a schematic diagram which illustrates a fully mirrored distribution of data D in storage system 12 (FIG. 1), and FIG. 8 is a flowchart illustrating a procedure 100 for performing the distribution, according to preferred embodiments of the present invention. Procedure 100 allocates each specific stripe to a primary device Bn1, and a copy of the specific stripe to a secondary device Bn2, n1≠n2, so that each stripe is mirrored. To implement the mirrored distribution, in a first step 102 of procedure 100, CPU 26 determines primary device Bn1 for locating a stripe using procedure 50 or procedure 70. In a second step 104, CPU 26 determines secondary device Bn2 for the stripe using procedure 50 or procedure 70, assuming that device Bn1 is not available. In a third step 106, CPU 26 allocates copies of the stripe to devices Bn1 and Bn2, and writes the device identities to a table 34 in memory 28, for future reference. CPU 26 implements procedure 100 for all stripes 36 in devices Bn.

Table IV below illustrates devices Bn1 and Bn2 determined for stripes 6058-6078 of Table I, where steps 102 and 104 use procedure 50.

TABLE IV

| Stripe | Device $B_{n1}$ | Device $B_{n2}$ |
|---|---|---|
| 6058 | $B_2$ | $B_4$ |
| 6059 | $B_2$ | $B_5$ |
| 6060 | $B_4$ | $B_2$ |
| 6061 | $B_5$ | $B_4$ |
| 6062 | $B_3$ | $B_1$ |
| 6063 | $B_5$ | $B_4$ |
| 6064 | $B_1$ | $B_3$ |
| 6065 | $B_3$ | $B_4$ |
| 6066 | $B_2$ | $B_5$ |
| 6067 | $B_3$ | $B_1$ |
| 6068 | $B_1$ | $B_3$ |
| 6069 | $B_2$ | $B_5$ |

TABLE IV-continued

| Stripe | Device $B_{n1}$ | Device $B_{n2}$ |
|---|---|---|
| 6070 | $B_4$ | $B_1$ |
| 6071 | $B_5$ | $B_3$ |
| 6072 | $B_4$ | $B_2$ |
| 6073 | $B_1$ | $B_3$ |
| 6074 | $B_5$ | $B_1$ |
| 6075 | $B_3$ | $B_5$ |
| 6076 | $B_1$ | $B_3$ |
| 6077 | $B_2$ | $B_4$ |
| 6078 | $B_4$ | $B_1$ |

If any specific device Bn becomes unavailable, so that only one copy of the stripes on the device is available in system 12, CPU 26 may implement a procedure similar to procedure 100 to generate a new second copy of the stripes that were on the unavailable device. For example, if after allocating stripes 6058-6078 according to Table IV, device B3 becomes unavailable, copies of stripes 6062, 6065, 6067, and 6075, need to be allocated to new devices in system 12 to maintain full mirroring. Procedure 100 may be modified to find the new device of each stripe by assuming that the remaining device, as well as device B3, is unavailable. Thus, for stripe 6062, CPU 26 assumes that devices B1 and B3 are unavailable, and determines that instead of device B3 the stripe should be written to device B4. Table V below shows the devices that the modified procedure 100 determines for stripes 6058, 6060, 6062, 6065, 6072, and 6078, when B3 becomes unavailable.

TABLE V

| Stripe s | Device $B_{n1}$ | Device $B_{n2}$ |
|---|---|---|
| 6062 | $B_1$ | $B_2$ |
| 6065 | $B_4$ | $B_5$ |
| 6067 | $B_1$ | $B_4$ |
| 6075 | $B_5$ | $B_2$ |

It will be appreciated that procedure 100 spreads locations for stripes 36 substantially evenly across all devices Bn, while ensuring that each pair of copies of any particular stripe are on different devices, as is illustrated in FIG. 7. Furthermore, the even distribution of locations is maintained even when one of devices Bn, becomes unavailable. Either copy, or both copies, of any particular stripe may be used when host 24 communicates with system 12. It will also be appreciated that in the event of one of devices Bn becoming unavailable, procedure 100 regenerates secondary locations for copies of stripes 36 that are evenly distributed over devices Bn.

Referring back to FIG. 1, it will be understood that the sizes of tables 30, 32, or 34 are a function of the number of stripes in system 12, as well as the number of storage devices in the system. Some preferred embodiments of the present invention reduce the sizes of tables 30, 32, or 34 by duplicating some of the entries of the tables, by relating different stripes mathematically. For example, if system 12 comprises 2,000,000 stripes, the same distribution may apply to every 500,000 stripes, as illustrated in Table VI below. Table VI is derived from Table I.

TABLE VI

| Stripe s | Stripe s | Stripe s | Stripe s | Device $B_S$ |
|---|---|---|---|---|
| 1 | 500,001 | 1,000,001 | 1,500,001 | $B_3$ |
| 2 | 500,002 | 1,000,002 | 1,500,002 | $B_5$ |
| ... | ... | ... | ... | ... |
| 6059 | 506,059 | 1,006,059 | 1,506,059 | $B_2$ |
| 6060 | 506,060 | 1,006,060 | 1,506,060 | $B_4$ |
| ... | ... | ... | ... | ... |

It will be appreciated that procedures such as those described above may be applied substantially independently to different storage devices, or types of devices, of a storage system. For example, a storage system may comprise a distributed fast access cache coupled to a distributed slow access mass storage. Such a storage system is described in more detail in the U.S. Application titled "Distributed Independent Cache Memory," filed on even date, and assigned to the assignee of the present invention. The fast access cache may be assigned addresses according to procedure 50 or modifications of procedure 50, while the slow access mass storage may be assigned addresses according to procedure 70 or modifications of procedure 70.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for distributing data among a plurality of storage devices, comprising the steps of:

assigning a first identifier to a first storage device;

assigning a second identifier to a second storage device;

randomly assigning the first identifier or the second identifier to each of a plurality of logical addresses in a first iteration such that each logical address is randomly assigned the first identifier or the second identifier in the first iteration;

transferring the data to the logical addresses in accordance with the random assignment in the first iteration;

adding a third storage device to increase the number of storage devices after the random assignment in the first iteration;

assigning a third identifier to the third storage device;

randomly assigning the first identifier, the second identifier, or the third identifier to each of the plurality of logical addresses in a second iteration occurring at a time subsequent to the first time;

if the randomly assigned identifier in the second iteration is the third identifier, transferring the logical address and its associated data to the third storage device;

if the randomly assigned identifier in the second iteration is the first identifier or the second identifier, leaving the logical address and its associated data in the first storage device or the second storage device in accordance with the random assignment in the first iteration;

creating a copy of the data;

randomly assigning the first identifier, the second identifier, or the third identifier to each of the plurality of logical addresses in a third iteration; and transferring the copy of the data to the logical addresses in accordance with the random assignment in the third iteration such that the data and the copy of the data are stored on different storage devices, wherein:

a storage device storing the data in accordance with the first iteration and the second iteration is functioning and available, but is treated as unavailable when randomly assigning the first identifier, the second identifier, or the third identifier to each of the plurality of logical addresses in the third iteration for each respective copy of the data, and the storage device is treated as available after randomly assigning the first identifier, the second identifier, or the third identifier to each of the plurality of logical addresses in the third iteration.

2. The method of claim 1, further comprising the steps of:

removing the second storage device;

randomly assigning first identifier or the third identifier to each of the logical addresses in the second storage device in a third iteration; and transferring each logical address and its associated data in the second storage device to the first storage device or the third storage device in accordance with the random assignment in the third iteration.

3. The method of claim 2, further comprising:

adding a fourth storage device to increase the number of storage devices after the random assignment in the first iteration and before removing the second storage device;

assigning a fourth identifier to the fourth storage device;

randomly assigning the first identifier, the second identifier, the third identifier, and the fourth identifier to each of the plurality of logical addresses in a fourth iteration prior to the third iteration;

creating a copy of the data after the third iteration;

randomly assigning the first identifier, the third identifier, and the fourth identifier to each of the plurality of logical addresses in a fifth iteration; and transferring the copy of the data to the logical addresses in accordance with the random assignment in the fifth iteration such that the data and the copy of the data are stored on different storage devices, wherein a storage device storing the data in accordance with the first iteration, the second iteration, and the fourth iteration is treated as unavailable when randomly assigning the first identifier, the third identifier, or the fourth identifier to each of the plurality of logical addresses in the fifth iteration for each respective copy of the data.

4. The method of claim 1, wherein the first storage device, the second storage device, and the third storage each comprises a fast access time memory.

5. The method of claim 1, wherein the first storage device, the second storage device, and the third storage device, each comprises a slow access time mass storage device.

6. The method of claim 1, wherein the first storage device, the second storage device, and the third storage device include substantially equal capacities.

7. The method of claim 1, wherein at least two of the first storage device, the second storage device, and the third storage device include different storage capacities.

8. A system for distributing data, comprising:

a plurality of storage devices;

a memory storing code for distributing data among the plurality of storage devices; and a processor in communication with the plurality of storage devices and the memory, wherein the processor, when executing the code, is configured to:

assign a first identifier to a first storage device, assign a second identifier to a second storage device, randomly assigning the first identifier or the second identifier to each of a plurality of logical addresses in a first iteration such that each logical address is randomly assigned the first identifier or the second identifier in the first iteration, transfer the data to the logical addresses in accordance with the random assignment in the first iteration, determine that a third storage device has been added to the system after the random assignment in the first iteration, assign a third identifier to the third storage device, randomly assign the first identifier, the second identifier, or the third identifier to each of the plurality of logical addresses in a second iteration occurring at a time subsequent to the first time, if the randomly assigned identifier in the second iteration is the third identifier, transferring the logical address and its associated data to the third storage device, if the randomly assigned identifier in the second iteration is the first identifier or the second identifier, leaving the logical address and its associated data in the first storage device or the second storage device in accordance with the random assignment in the first iteration, create a copy of the data, randomly assign the first identifier, the second identifier, or the third identifier to each of the plurality of logical addresses in a third iteration, and transfer the copy of the data to the logical addresses in accordance with the random assignment in the third iteration such that the data and the copy of the data are stored on different storage devices, wherein:

a storage device storing the data in accordance with the first iteration and the second iteration is functioning and available, but is treated as unavailable when randomly assigning the first identifier, the second identifier, or the third identifier to each of the plurality of logical addresses in the third iteration for each respective copy of the data, and the storage device is treated as available after randomly assigning the first identifier, the second identifier, or the third identifier to each of the plurality of logical addresses in the third iteration.

9. The system of claim 8, wherein the processor is further configured to:

determine that the second storage device has been removed;

randomly assign first identifier or the third identifier to each of the logical addresses in the second storage device in a third iteration; and transfer each logical address and its associated data in the second storage device to the first storage device or the third storage device in accordance with the random assignment in the third iteration.

10. The system of claim 9, wherein the processor, when executing the code, is further configured to:

add a fourth storage device to increase the number of storage devices after the random assignment in the first iteration and before removing the second storage device;

assign a fourth identifier to the fourth storage device;

randomly assign the first identifier, the second identifier, the third identifier, and the fourth identifier to each of the plurality of logical addresses in a fourth iteration prior to the third iteration;

create a copy of the data after the third iteration;

randomly assign the first identifier, the third identifier, and the fourth identifier to each of the plurality of logical addresses in a fifth iteration; and transfer the copy of the data to the logical addresses in accordance with the random assignment in the fifth iteration such that the data and the copy of the data are stored on different storage devices,
  wherein a storage device storing the data in accordance with the first iteration, the second iteration, and the fourth iteration is treated as unavailable when randomly assigning the first identifier, the third identifier, or the fourth identifier to each of the plurality of logical addresses in the fifth iteration for each respective copy of the data.

11. The system of claim 8, wherein the first storage device, the second storage device, and the third storage each comprises one of a fast access time memory and a slow access time mass storage device.

12. The system of claim 8, wherein the first storage device, the second storage device, and the third storage device include substantially equal capacities.

13. The system of claim 8, wherein at least two of the first storage device, the second storage device, and the third storage device include different storage capacities.

14. A computer storage medium comprising a computer program product method for distributing data among a plurality of storage devices, the computer storage medium comprising:
  code for assigning a first identifier to a first storage device;
  code for assigning a second identifier to a second storage device;
  code for randomly assigning the first identifier or the second identifier to each of a plurality of logical addresses in a first iteration such that each logical address is randomly assigned the first identifier or the second identifier in the first iteration;
  code for transferring the data to the logical addresses in accordance with the random assignment in the first iteration;
  code for determining that a third storage device has been added to the system after the random assignment in the first iteration;
  code for assigning a third identifier to the third storage device;
  code for randomly assigning the first identifier, the second identifier, or the third identifier to each of the plurality of logical addresses in a second iteration occurring at a time subsequent to the first time;
  code for transferring the logical address and its associated data to the third storage device if the randomly assigned identifier in the second iteration is the third identifier;
  code for leaving the logical address and its associated data in the first storage device or the second storage device in accordance with the random assignment in the first iteration if the randomly assigned identifier in the second iteration is the first identifier or the second identifier;
  code for creating a copy of the data;
  code for randomly assigning the first identifier, the second identifier, or the third identifier to each of the plurality of logical addresses in a third iteration; and
  code for transferring the copy of the data to the logical addresses in accordance with the random assignment in the third iteration such that the data and the copy of the data are stored on different storage devices, wherein:
    a storage device storing the data in accordance with the first iteration and the second iteration is functioning and available, but is treated as unavailable when randomly assigning the first identifier, the second identifier, or the third identifier to each of the plurality of logical addresses in the third iteration for each respective copy of the data, and
    the storage device is treated as available after randomly assigning the first identifier, the second identifier, or the third identifier to each of the plurality of logical addresses in the third iteration.

15. The computer storage medium of claim 14, further comprising:
  code for determining that the second storage device has been removed;
  code for randomly assigning first identifier or the third identifier to each of the logical addresses in the second storage device in a third iteration; and
  code for transferring each logical address and its associated data in the second storage device to the first storage device or the third storage device in accordance with the random assignment in the third iteration.

16. The computer storage medium of claim 15, further comprising:
  code for adding a fourth storage device to increase the number of storage devices after the random assignment in the first iteration and before removing the second storage device;
  code for assigning a fourth identifier to the fourth storage device;
  code for randomly assigning the first identifier, the second identifier, the third identifier, and the fourth identifier to each of the plurality of logical addresses in a fourth iteration prior to the third iteration;
  code for creating a copy of the data after the third iteration;
  code for randomly assigning the first identifier, the third identifier, and the fourth identifier to each of the plurality of logical addresses in a fifth iteration; and
  code for transferring the copy of the data to the logical addresses in accordance with the random assignment in the fifth iteration such that the data and the copy of the data are stored on different storage devices,
    wherein a storage device storing the data in accordance with the first iteration, the second iteration, and the fourth iteration is treated as unavailable when randomly assigning the first identifier, the third identifier, or the fourth identifier to each of the plurality of logical addresses in the fifth iteration for each respective copy of the data.

17. The computer storage medium of claim 14, wherein the first storage device, the second storage device, and the third storage each comprises a fast access time memory.

18. The computer storage medium of claim 14, wherein the first storage device, the second storage device, and the third storage device, each comprises a slow access time mass storage device.

19. The computer storage medium of claim 14, wherein the first storage device, the second storage device, and the third storage device include substantially equal capacities.

20. The computer storage medium of claim 14, wherein at least two of the first storage device, the second storage device, and the third storage device include different storage capacities.

* * * * *